(12) United States Patent
Perlin et al.

(10) Patent No.: US 6,285,380 B1
(45) Date of Patent: *Sep. 4, 2001

(54) METHOD AND SYSTEM FOR SCRIPTING INTERACTIVE ANIMATED ACTORS

(75) Inventors: Kenneth Perlin, New York; Athomas Goldberg, Brooklyn, both of NY (US)

(73) Assignee: New York University, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/180,333

(22) PCT Filed: Aug. 1, 1997

(86) PCT No.: PCT/US97/13664

§ 371 Date: Nov. 4, 1998

§ 102(e) Date: Nov. 4, 1998

(87) PCT Pub. No.: WO98/06043

PCT Pub. Date: Feb. 12, 1998

Related U.S. Application Data

(63) Continuation-in-part of application No. 08/511,737, filed on Aug. 7, 1995, and a continuation-in-part of application No. 08/284,799, filed on Aug. 2, 1994.
(60) Provisional application No. 60/023,052, filed on Aug. 2, 1996.

(51) Int. Cl.[7] .................................................. G06T 15/70
(52) U.S. Cl. .............................................................. 345/473
(58) Field of Search ..................................... 345/473, 474, 345/475

(56) References Cited

U.S. PATENT DOCUMENTS

| | | | |
|---|---|---|---|
| 5,252,953 | * 10/1993 | Sandrew et al. | 345/122 |
| 5,261,041 | * 11/1993 | Susman | 395/152 |
| 5,600,774 | * 2/1997 | Spohrer | 395/174 |
| 5,604,857 | * 2/1997 | Walmsley | 395/173 |
| 5,706,417 | * 1/1998 | Adelson | 395/129 |
| 5,867,175 | * 2/1999 | Katzenberger et al. | 345/473 |
| 5,877,778 | * 3/1999 | Dow et al. | 345/474 |
| 5,923,337 | * 7/1999 | Yamamoto | 345/473 |

OTHER PUBLICATIONS

R. Brooks, A Robust Layered Control System for a Mobile Robot, IEEE Journal of Robotics and Automation, vol. RA–2, No. 1, Mar. 1986, pp. 14–23.

J. Bates et al., Integrating Reactivity, Goals, and Emotion in a Broad Agent, Proceedings of the 14th Annual Conference of the Cognitive Science Society, Indiana, Jul. 1992, pp. 696–701.

(List continued on next page.)

*Primary Examiner*—Almis R. Jankus
*Assistant Examiner*—Enrique L Santiago
(74) *Attorney, Agent, or Firm*—Bakers Botts L.L.P.

(57) ABSTRACT

A system for the creation of real-time, behavior-based animated actors. The system provides tools to create actors that respond to users and to each other in real-time, with personalities and moods consistent with the author's goals and intentions. The system includes two subsystems. The first subsystem is an Animation Engine that uses procedural techniques to enable authors to create layered, continuous, non-repetitive motions and smooth transitions between them. The second subsystem is a Behavior Engine that enables authors to create sophisticated rules governing how actors communicate, change, and make decisions. The combined system provides an integrated set of tools for authoring the "minds" and "bodies" of interactive actors. The system uses an english-style scripting language so that creative experts who are not primarily programmers can create powerful interactive applications. The system allows authors of various abilities to create remarkably lifelike, responsively animated character interactions that can be run over networks in real time.

40 Claims, 5 Drawing Sheets

OTHER PUBLICATIONS

D. Terzopoulos, et al., Artificial Fishes: Autonomous Locomotion, Perception, Behavior, and Learning in a Simulated Physical World, Artificial Life, 1995, vol. 1, No. 4, :pp. 327–351.

M. Girard, et al., Computational Modeling for the Computer Animation of Legged Figures, Computer Graphics, SIGGRAPH '85 Proceedings, 1985, 20(3), pp. 263–270.

C. Morawetz, et al., Goal–Directed Human Animation of Multiple Movements, Proc. Graphics Interface, 1990, pp. 60–67.

Karl Sims, Evolving Virtual Creatures, Computer Graphics, SIGGRAPH '94 Proceedings, 28(3), pp. 15–22.

Pattie Maes, et al., The ALIVE System: Full–body Interaction with Autonomous Agents, Computer Animation '95 Conference, Switzerland, Apr. 1995 IEEE Press, pp. 11–18.

Bruce M. Blumberg, et al., Multi–Level Direction of Autonomous Creatures for Real–Time Virtual Environments, Computer Graphics (SIGGRAPH '95 Proceedings), 1995, 30(3), pp. 47–54.

John E. Chadwick, Layered Construction for Deformable Animated Characters. Computer Graphics, Jul., 1989, vol. 23, No. 3, pp. 243–252.

Steven Henry Strassmann, Desktop Theater: Automatic Generation of Expressive Animation, PhD thesis, MIT Media Lab, Jun., 1991.

Michael Boyle Johnson, Wavesworld: A Testbed for Three Dimensional Semi–Autonomous Animated Characters, PhD thesis, MIT, Jun., 1995.

* cited by examiner

METHOD AND SYSTEM FOR SCRIPTING INTERACTIVE ANIMATED ACTORS

CROSS-REFERENCE TO A RELATED APPLICATION

This application is a continuation-in-part application of U.S. patent application Ser. No. 08/284,799 filed on Aug. 2, 1994, and U.S. patent application Ser. No. 08/511,737 filed on Aug. 7, 1995, and claims benefits of No. 60/023,052, filed Aug. 2, 1996. This application is also a 371 application of International Application No. PCT/US97/13664 filed on Aug. 1, 1997.

FIELD OF THE INVENTION

The present invention relates to a method and a system for creating real-time, behavior-based animated actors.

BACKGROUND INFORMATION

Cinema is a medium that can suspend disbelief. The audience enjoys the psychological illusion that fictional characters have an internal life. When this is done properly, the characters can take the audience on a compelling emotional journey. Yet cinema is a linear medium; for any given film, the audience's journey is always the same. Likewise, the experience is inevitably a passive one as the audience's reactions can have no effect on the course of events.

This suspension of disbelief, or believability, does not necessarily require a high degree of realism. For example, millions of people relate to Kermit the Frog and to Bugs Bunny as though they actually exist. Likewise, Bunraku puppet characters can create for their audience a deeply profound and moving psychological experience.

All of these media have one thing in common. Every moment of the audience's journey is being guided by talented experts, whether a screenwriter and actor/director, a writer/animator, or a playwright and team of puppeteers. These experts use their judgment to maintain a balance: characters must be consistent and recognizable, and must respond to each other appropriately at all times. Otherwise believability is lost.

In contrast, many current computer games are non-linear, offering variation and interactivity. While it is possible to create characters for these games that convey a sense of psychological engagement, it is extremely difficult with existing tools.

One limitation is that there is no expert, actor, director, animator or puppeteer, actually present during the unfolding drama, and so authors using existing techniques are limited by what they can anticipate and produce in advance.

There have been several recent efforts to build network distributed autonomous agents. Work done by Steve Strassman in the area of "Desktop Theater" explored the use of expressive authoring tools for specifying how characters would respond to direction. (S. Strassman, *Desktop Theater: Automatic Generation of Expressive Animation*, PhD thesis, MIT Media Lab, June 1991.) This work, however, did not deal with real time visual interaction.

The novel "Snow Crash" posits a "Metaverse," a future version of the Internet which appears to its participants as a quasi-physical world. (N. Stephenson, *Snow Crash* Bantam Doubleday, New York, 1992.) The participants are represented by fully articulate human figures, or avatars whose body movements are computed automatically by the system. "Snow Crash" touches on the importance of proper authoring tools for avatars, although it does not describe those tools.

The present invention takes these notions further, in that it supports autonomous figures that do not directly represent any participant.

Several autonomous actor simulation systems have been developed which follow the parallel layered intelligence model illustrated in M. Minsky, *Society of Mind*, MIT press, 1986. Such a model was partially implemented by the subsumption architecture described by R. Brooks (*A Robust Layered Control for a Mobile Robot*, IEEE Journal of Robotics and Automation, 2(1):14–23, 1986) as well as by J. Bates et al. (*Integrating Reactivity, Goals and Emotions in a Broad Agent*, Proceedings of the 14th Annual Conference of the Cognitive 30 Science Society, Indiana, July 1992) and M. Johnson (*WavesWorld*: PhD Thesis, *A Testbed for Three Dimensional Semi-Autonomous Animated Characters, MIT,* 1994). Each of these systems, however, solve distinctly different problems than that of the present invention.

The "Jack" system described in N. Badler et al., *Simulating Humans: Computer Graphics, Animation, and Control* Oxford University Press, 1993 focuses on proper task planning and biomechanical simulation. The general goal of that work is to produce accurate simulations of biomechanical robots. The simulations of Terzopoulis et. al (*Artificial Fishes: Autonomous Locomotion, Perception, Behavior, and Learning in a Simulated Physical World*, Artificial Life, 1(4):327–351, 1994) have autonomous animal behaviors that respond to their environment according to biomechanical rules. Autonomous figure animation has also been studied by N. Badler et al. (*Making Them Move: Mechanics, Control, and Animation of Articulated Figures* Morgan Kaufmann Publishers, San Mateo, Calif., 1991), M. Girard et al. (*Computational modeling for the computer animation of legged figures*, Computer Graphics, SIGGRAPH '85 Proceedings, 20(3):263–270, 1985), C. Morawetz et al. (*Goal-directed human animation of multiple movements*, Proc. Graphics Interface, pages 60–67, 1990) and K. Sims (*Evolving virtual creatures*, Computer Graphics, SIGGRAPH '94 Proceedings, 28(3):15–22, 1994).

The "Alive" system of P. Maes et al. (*The Alive System: Full Body Interaction with Autonomous Agents* in Computer Animation '95 Conference, Switzerland, April 1995 IEEE Press, pages 11–18) focuses on self-organizing embodied agents which are capable of making inferences and of learning from their experiences. Instead of maximizing the author's ability to express personality, the "Alive" system uses ethological mechanisms to maximize the actor's ability to reorganize its own personality, based on its own perception and accumulated experience.

In general, however, the above efforts do not focus on the author's point of view. To create rich interactive worlds inhabited by believable animated actors, the need exists to provide authors with the proper tools.

SUMMARY OF THE INVENTION

The present invention is directed to the problem of building believable animated characters that respond to users and to each other in real-time, with consistent personalities, properly changing moods and without mechanical repetition, while always maintaining the goals and intentions of the author.

An object of the method and system according to the present invention is to enable authors to construct various aspects of an interactive application. The present invention provides tools which are intuitive to use, allow for the creation of rich, compelling content and produce behavior at run-time which is consistent with the author's vision and intentions. The animated actors are able to respond to a variety of user-interactions in ways that are both appropriate and non-repetitive. The present invention enables multiple actors to work together while faithfully carrying out the author's intentions, allowing the author to control the choices the actors make and how the actors move their bodies. As such, the system of the present invention provides an integrated set of tools for authoring the "minds" and "bodies" of interactive actors.

In accordance with an embodiment of the present invention, animated actors follow scripts, sets of author-defined rules governing their behavior, which are used to determine the appropriate animated actions to perform at any given time. The system of the present invention also includes a behavioral architecture that supports author-directed, multi-actor coordination as well as run-time control of actor behavior for the creation of user-directed actors or avatars. The system uses a plain-language, or "english-style" scripting language and a network distribution model to enable creative experts, who are not primarily programmers, to create powerful interactive applications.

The present invention provides a method and system for manipulating the geometry of one or more animated characters displayed in real-time in accordance with an actor behavior model. The present invention employs an actor behavior model similar to that proposed by B. Blumberg et al., *Multi-Level Direction of Autonomous Creatures for Real-Time Virtual Environments* Computer Graphics (SIGGRAPH '95 Proceedings), 30(3):47–54, 1995.

The system of the present invention comprises two subsystems. The first subsystem is an Animation Engine that uses procedural techniques to enable authors to create layered, continuous, non-repetitive motions and smooth transitions between motions. The Animation Engine utilizes descriptions of atomic animated actions (such as walk or wave) to manipulate the geometry of the animated actor.

The second subsystem is a Behavior Engine that enables authors to create sophisticated rules governing how actors communicate, change, and make decisions. The Behavior Engine is responsible for both higher-level capabilities (such as going to the store or engaging another actor in a conversation) and determining which animations to trigger. The Behavior Engine also maintains the internal model of the actor, representing various aspects of an actor's moods, goals and personality. The Behavior Engine constitutes the "mind" of the actor. At run-time, an actor's movements and behavior are computed by iterating an "update cycle" that alternates between the Animation and Behavior Engines.

DETAILED DESCRIPTION

Figure 1:
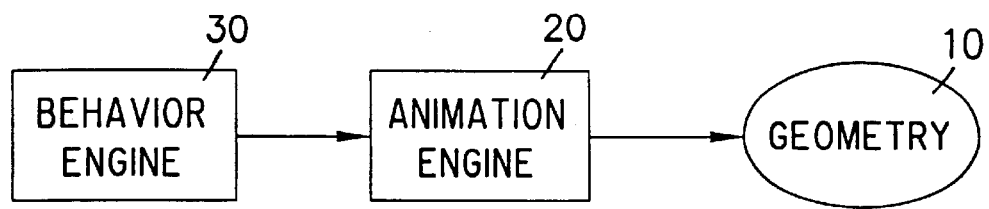
FIG. 1 shows a block diagram of the behavior model of an animated actor, in accordance with the present invention.

FIG. 1 is a block diagram of a behavior model describing the major functional components of an animated actor's behavior. As shown in FIG. 1, the behavior model comprises a geometry model 10 that is manipulated in real-time, an Animation Engine 20 which utilizes descriptions of atomic animated actions (such as "walk" or "wave") to manipulate the geometry, and a Behavior Engine 30 which is responsible for higher-level capabilities, such as "going to the store," or engaging another actor in a conversation, and decisions about which animations to trigger. In addition, the Behavior Engine 30 maintains the internal model of the actor, representing various aspects of the actor's moods, goals and personality. In essence, the Behavior Engine 30 constitutes the "mind" of the actor, whereas the Animation Engine constitutes the "body" of the actor.

At run-time, an actor's movements and behavior are computed by iterating an update cycle that alternates between the Animation and Behavior Engines.

The Animation Engine 20 provides tools for manipulating the geometry 10 by generating and interactively blending realistic gestures and motions. The Animation Engine controls the body of the actor. Actors are able to move from one animated motion to another in a smooth and natural fashion in real time. The motions can be layered and blended to convey different moods and personalities. Such an Animation Engine is described in U.S. patent application Ser. No. 08/234,799, filed Aug. 2, 1994, entitled GESTURE SYNTHESIZER FOR IMAGE ANIMATION, and incorporated herein by reference in its entirety, and U.S. patent application Ser. No. 08/511,737, filed Aug. 7, 1995, entitled COMPUTER GENERATED INTERACTION OF CHARACTERS IN IMAGE ANIMATION, and incorporated herein by reference in its entirety.

Figure 2:
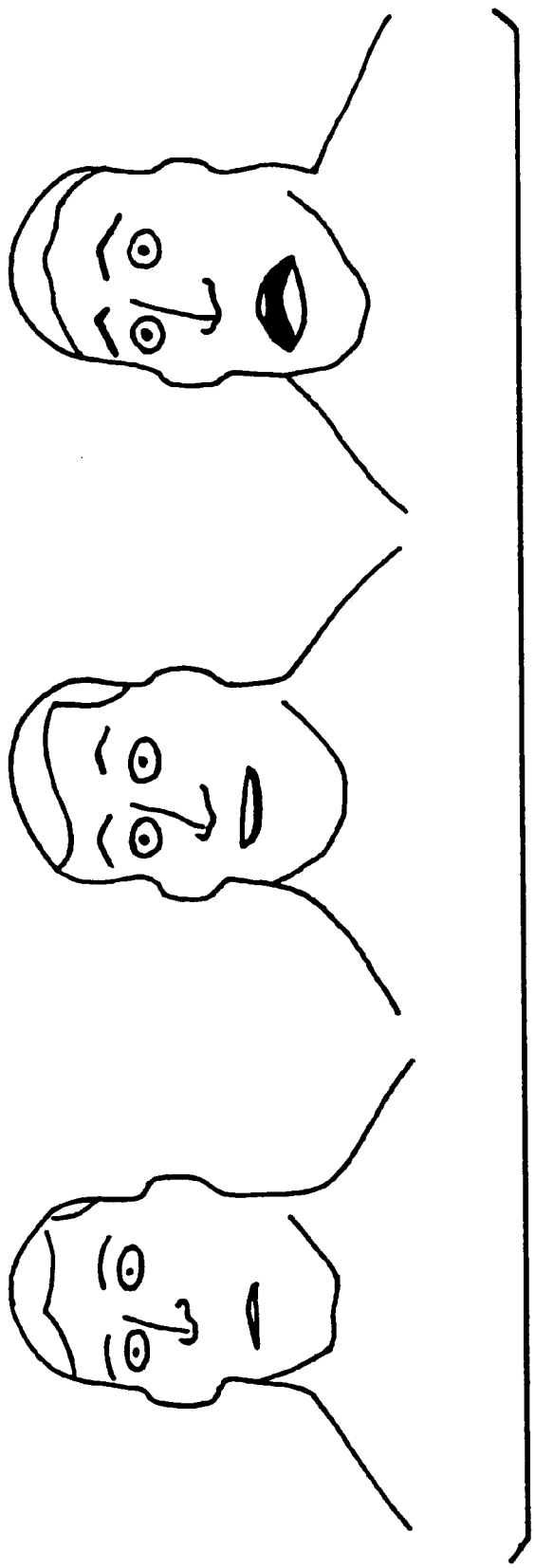
FIG. 2 illustrates the flexing of a deformable mesh.

Using the geometric model 10, an author is able to build any of a variety of articulated characters. Actors can be given the form of humans, animals, animated objects or imaginary creatures. The geometric model of an actor consists of parts that are connected by rotational joints. The model can be deformable, which is useful for muscle flexing or facial expressions. Such deformation is illustrated in FIG. 2. A method which can be used in conjunction with the present invention for generating such deformations in animated actors is described in J. Chadwick et al., *Layered construction for deformable animated characters*. Computer Graphics (SIGGRAPH '89 Proceedings), 23(3):243–252, 1989 89.

An author can specify individual actions in terms of how those actions cause changes over time to each individual degree of freedom (DOF) in the model. The system then combines these DOF values to make smooth transitions and layerings among actions.

There are various types of DOFs that an author can control. The simplest are the three rotational axes between any two connected parts of the geometric model 10. Examples of actions involving such DOFs are head turning and knee bending.

The author can also position a part, such as a hand or a foot.

The system automatically does the necessary inverse kinematics to preserve the kinematic chain. From the author's point of view, the x,y,z coordinates of the part are each directly available as a DOF.

The author can also specify part mesh deformations as DOFs. To make a deformation, the author provides a "deformation target," a version of the model (or just some parts of the model) in which some vertices have been moved. For each deformation target, the system detects which vertices have been moved, and builds a data structure containing the x,y,z displacement for each such vertex. For example, if the author provides a smiling face as a deformation target, he can then declare SMILE to be a DOF. The author can then specify various values for SMILE between 0 (no smile) and 1 (full smile). The system handles the necessary interpolation between mesh vertices. In the particular case of smiling, the author can also specify negative values for SMILE, to make the face frown.

In accordance with the present invention, the author defines an action as a list of DOFs, together with a range and a time-varying expression for each DOF. Most actions are constructed by varying a few DOFs over time via combinations of sine, cosine and coherent noise. For example, sine and cosine signals are used together within actions to impart elliptical rotations.

Coherent noise is used in the method and system of the present invention to enhance realism. Using noise in limb movements allows authors to give the impression of naturalistic motions without the need to incorporate complex simulation models. Coherent noise can be used to convey the small motions of a character trying to maintain balance, the controlled randomness of eye blinking, or the way a character's gaze wanders around a room. Although in real life each of these examples has a different underlying mechanism, viewers do not perceive the mechanism itself but rather perceive some statistics of the motion produced by the mechanism. When coherent noise is applied in a way that matches those statistics, the actor's movements are believable. Use of noise to produce realistic animated motion is described in U.S. patent application Ser. No. 08/234,799, filed Aug. 2, 1994, entitled GESTURE SYNTHESIZER FOR IMAGE ANIMATION, and incorporated herein by reference in its entirety, and in U.S. patent application Ser. No. 08/511,737, filed Aug. 7, 1995, entitled COMPUTER GENERATED INTERACTION OF CHARACTERS IN IMAGE ANIMATION, and incorporated herein by reference in its entirety.

The author can also import keyframed animation from commercial modeling systems such as Alias or SoftImage. The system internally converts these into actions that specify time varying values for various DOF'S. To the rest of the system, these imported actions look identical to any other action.

In accordance with the present invention, an author uses DOFs to build actions. An exemplary syntax for expressing actions will now be described.

In each line of an action, a body part name is followed first by three angular intervals, and then by three time-varying interpolants in braces. Expressions for three exemplary hand waving actions, which an actor might perform as gestures while talking, for example, are as follows:

define ACTION "Talk Gesture1"

{
R_UP_ARM    25:55    0          -35:65   {N0   0    N0}
R_LO_ARM    55:95    0          0        {N1   0    0}
R_HAND      -40:25   75:-25     120      {N1   N2   0}
} define ACTION "Talk Gesture2"

{
R_UP_ARM    10:47    0          -10:45   {N0   0    N0}
R_LO_ARM    35:77    0          0        {N1   0    0}
R_HAND      -53:55   -40:15     120      {N1   N2   0}
} define ACTION "Talk-Gesture3"

{
R_UP_ARM    45       20:15      0        {0    N0   N0}
R_LO_ARM    70:120   0          0        {N1   0    0}
R HAND      40:15    0          120      {N2   0    0}
}

Each interpolant is used to compute a single angle in its corresponding interval. The results are applied to the corresponding part as pitch, roll and yaw rotations respectively. The angle intervals are constant over time, whereas the time varying interpolants are reevaluated at each update cycle. For example, in the first line of the "Talk Gesture1" action above, if N0 has the value 0.5 at some time step, then the resulting pitch rotation at that time step will be 40 degrees, 0.5 of the way between 25 degrees and 55 degrees.

Each one of the above expressions uses several frequencies of noise to modulate arm movement. The first two are general hand waving gestures, while the third shakes the arm more emphatically, as though pointing at the listener. The variables N0, N1, and N2 are shorthand that the system provides the author to denote time varying coherent noise signals of different frequencies. For instance, N1 is one octave higher than N0, and N2 is one octave higher than N1. The value of each noise signal varies between 0.0 and 1.0.

Note that in the exemplary talk gestures listed above, the upper arm movement is controlled by N0, whereas the lower arm movement is controlled by N1. The result is that the upper arm will, on average, swing back and forth about the shoulder once per second, whereas the lower arm will, on average swing back and forth about the elbow twice per second. At the same time, the hand, which is controlled by N2, makes small rapid rotations about the wrist. Although many combinations of frequencies can be used, the exemplary frequency combination discussed imparts motion that appears natural. Presumably, the 2:1 frequency ratio reflects the fact that the lower arm has about half the mass of the total arm and thus tends to swing back and forth about twice as frequently.

Animated actors generated in accordance with the present invention can do many things at once and these simultaneous activities can interact in different ways. For example, an author may want an actor who is waving to momentarily scratch his head with the same hand. It would be incorrect for the waving movement to continue during the time the actor is scratching his head. The result could be strange. For example, the actor might try feebly to wave his arm while making vague scratching motions about his head. In this case, it is desirable to decrease the amount of waving activity as the amount of scratching activity increases. In other words, some sort of ease-in/out transition between motions is needed.

However, if the author wants an actor to scratch his head for a moment while walking downstage, it would be incorrect if the system were to force the actor to stop walking every time he scratched his head. In this case, an ease-in/out transition would be inappropriate.

The difference between the aforementioned examples is that the former situation involves two actions which cannot coexist, whereas the latter situation involves two actions that can gracefully coexist. The present invention provides a mechanism which allows an author, in an easy and unambiguous way, to make distinctions between actions which cannot coexist and actions that can gracefully coexist. To accomplish this, the system employs a set of rules.

Motion can be treated as being layered, analogously to composited images which can be layered back to front. However, whereas an image maps pixels to colors, an action maps DOFs to values. The system of the present invention allows an author to place actions in different groups, which groups are organized in a "back-to-front" order. Also, the system allows the author to "select" any action.

Given this structure, the system of the present invention follows the following compositing rules:

1) Actions which are in the same group compete with each other. At any moment, every action possesses some weight, or opacity. When an action is selected, its weight transitions smoothly from zero to one. Meanwhile, the weights of all other actions in the same group transition smoothly down to zero.

2) Actions in groups which are further forward obscure those in groups which are further back.

In accordance with the present invention, actions which compete with each other should be placed by the author in the same group. Some actions, such as walking, are fairly global in that they involve many DOFs throughout the body. Others, such as head scratching, are fairly localized and involve relatively few DOFs. The author should place more global actions in the rear-most groups. More localized actions should be placed in front of the global actions. Also, some actions are relatively persistent, while others are generally done fleetingly. Groups of very fleeting or temporary action (such as scratching or coughing) should be placed still further in front.

For the author, the present invention makes it easy to specify intuitively reasonable action relationships. For example, suppose the author specifies the following action grouping:

| GROUP Stances | |
|---|---|
| ACTION | Stand |
| ACTION | Walk |
| GROUP Gestures | |
| ACTION | No_waving |
| ACTION | Wave_left |
| ACTION | Wave_right |
| GROUP Momentary | |
| ACTION | No_scratching |
| ACTION | Scratch_head_left |

After standing, the actor will start to walk. While continuing to walk he will wave with his left hand. Then he will scratch his head with his left hand, and resume waving again. Finally, he will switch over to waving with his right hand.

The grouping structure of the present invention allows the author to easily impart to the actor many behavioral rules. For example, given the above exemplary action groupings, the actor "knows" to wave with either one hand or the other but not both at once. The actor also "knows" he doesn't need to stop walking in order to wave or to scratch his head and "knows" that after he's done scratching he can resume whatever else he was doing with that arm.

At any animation frame, the run-time system must assign a unique value to each DOF for the model, then move the model into place and render it. The procedure for computing these DOFs will now be described. Within each group, a weighted sum is taken over the contribution of each action to each DOF. The values for all DOFs in every group are then composited, proceeding from back to front. The result is a single value for each DOF, which is then used to move the model into place. This algorithm should also correctly composite inverse kinematic DOFs over direct rotational DOFs. DOF compositing is described in U.S. patent application Ser. No. 08/234,799, filed Aug. 2, 1994, and entitled GESTURE SYNTHESIZER FOR IMAGE ANIMATION, which is incorporated herein by reference in its entirety, and in U.S. patent application Ser. No. 08/511,737, filed Aug. 7, 1995, and entitled COMPUTER GENERATED INTERACTION OF CHARACTERS IN IMAGE ANIMATION, which is incorporated herein by reference in its entirety.

The system of the present invention provides the author with tools to easily synchronize movements of the same DOF across actions. Transitions between actions that must have different tempos are handled using a morphing approach. During the time of the transition, the speed of a master clock is continuously varied from the first tempo to the second tempo, so that the phases of the two actions are always aligned. Similar techniques are described in A. Bruderlin et al., *Motion Signal Processing*, Computer Graphics (SIGGRAPH '95 Proceedings), 30(3):97–104, 1995 and A. Witkin et al., *Motion Warping*, Computer Graphics (SIGGRAPH '95 Proceedings), 30(3):105–108, 1995.

When it would be awkward for an actor to make a direct transition between two particular actions in a group, the system allows the author to insert a buffering action. For example, suppose an actor transitions from having his hands behind his back to crossing his arms over his chest. Because DOFs are combined linearly, the actor would pass his hands through his body. The system of the present invention allows the author to avoid such situations by declaring that some action in a group can be a buffering action for another. This is implemented by building a finite state machine that forces the actor to pass through this buffering action when entering or leaving the troublesome action.

Figure 3:
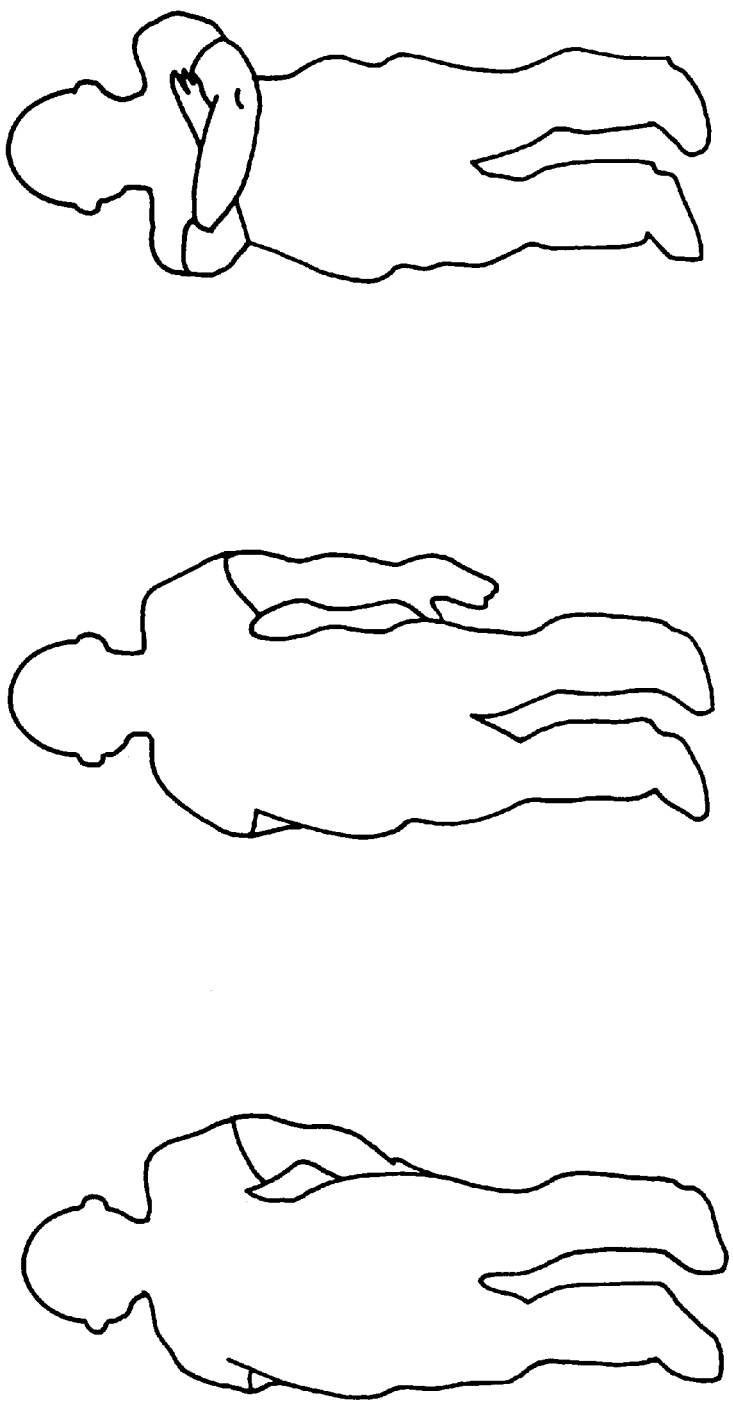
FIG. 3 illustrates the use of a buffering action.

For example, if the author declares hands-at-the-sides as a buffering action for hands-behind-the-back, when the actor transitions between hands-behind-the-back and any other action, he will always first move his hands around the sides of his body. This series of movements is illustrated in FIG. 3.

With the method and system of the present invention, one or more users can interact with the animated actors in real time. As such, the unpredictable involvement of a live user in the run-time system does not allow the author to create deterministic scenarios. The user's actions and responses are implicitly presenting the actor with a choice of what to do next. Because of this variability, the user's experience of an actor's personality and mood must be conveyed largely by that actor's probability of selecting one choice over another.

As a simple example, suppose the user often goes away for a while and keeps an actor waiting for various amounts of time. If the actor usually sits down or naps before the user returns, then the actor will appear to the user as a lazy or tired character. The user thus forms an impression based on probabilities.

The influence of the author lies in carefully tuning such probabilities. A goal of the Behavior Engine is to help the author in the most expressive way possible.

In accordance with the present invention, the Behavior Engine provides several authoring tools for guiding an actor's behavioral choices. The most basic tool is a simple parallel scripting system. Generally speaking, at any given moment, an actor will be executing a number of scripts in parallel. In each of these scripts, the most common operation is to select one item from a list of items. These items are usually other scripts or actions for the actor (or for some other actor) to perform.

The Behavior Engine in accordance with the present invention provides the author with "probability shaping" tools for guiding an actor's choices. The more expressive the tools for shaping these probabilities, the more believable the actors will be.

The operation of the Behavior Engine will now be described, starting with a description of the basic parallel scripting structure followed by a description of the probability shaping tools.

In accordance with the present invention, actions are the mechanism for the continuous control of the movements made by an actor's body. Scripts are provided as a mechanism for the discrete control of the decisions made by the actor's mind.

It is to be assumed that the user will be making unexpected responses. For this reason, it is not sufficient to provide the author with a tool for scripting long linear sequences. Rather, the system of the present invention allows the author to create layers of choices, from more global and slowly changing plans, to more localized and rapidly changing activities, that take into account the continuously changing state of the actor's environment, and the unexpected behavior of the human participant.

Like actions, the system of the present invention allows the author to organize scripts into groups. However, unlike actions, when a script within a group is selected, any other script that was running in the same group immediately stops. In any group at any given moment, exactly one script is running.

Generally, the author should organize into the same group those scripts that represent alternative modes that an actor can be in at some level of abstraction. For example, the group of activities that an actor performs during his day might be:

| ACTIVITIES | Resting Working Dining Conversing Performing |
|---|---|

In general, the author first specifies those groups of scripts that control longer term goals and plans. These tend to change slowly over time, and their effects are generally not immediately felt by the user.

The last scripts are generally those that are most physical. They tend to include actual body actions, in response to a user's actions and to the state of higher level scripts. For example, the behavior model of an actor might contain the following groups of scripts, in order, within a larger set of scripts:

| . . . | |
|---|---|
| DAY-PLANS | Waking Morning Lunch Afternoon Dinner Evening |
| . . . | |
| ACTIVITIES | Resting Working Dining Conversing Performing |
| . . . | |
| BEHAVIOR | Sleeping Eating Talking Joking Arguing Listening Dancing |

The Animation Engine, with its groups of continuous actions, can be thought of as an extension of this grouping structure to even lower semantic levels.

A script is organized as a sequence of clauses. At runtime, the system runs the clauses sequentially for the selected script in each group. At any update cycle, the system may run the same clause that it ran in the previous cycle, or it may move on to the next clause. The author is provided with tools to "hold" clauses in response to events or timeouts.

The two primary functions of a script clause are: 1) to trigger other actions or scripts and 2) to check, create or modify the actor's properties.

The simplest thing an author can do within a script clause is to trigger a specific action or script, which is useful when the author has a specific sequence of activities that he wants the actor to perform. In the following script example, the actor walks onstage, turns to the camera, bows, and then walks offstage again.

```
define SCRIPT "Curtain Call"
    {"walk to center"}
    {continue until { my location equals center } }
    {"turn to camera"}
    {continue until { "turn to camera" is done } }
    {"bow" }
    {continue for 3 seconds}
    {"walk offstage"}
```

In this case, phrases in quotes represent scripts or actions. Each of these scripts might, in turn, call other scripts and/or actions. The other information (continue, etc.) is used to control the timing of the scene.

Through layering, an author can create complex behaviors from simpler scripts and actions, as illustrated by the following example:

```
define SCRIPT "greeting"
{
    {"enter"}
    {wait 4 seconds}
    {"turn to camera"}
    {wait 1 second}
    {"wave" for 2 seconds
            "talk" for 6 seconds }
    {wait 3 seconds}
    {"sit"}
    {wait 5 seconds}
    {"bow" toward "Camera"}
    {wait 2 seconds}
    {"leave"}
}
```

In this example, the "enter" script is activated first. The "enter" script, can for example, cause the actor to walk to center stage. The "enter" script and "greeting" script are now running in parallel. The "greeting" script waits four seconds before activating the "turn to camera" script. This tells the actor to turn to face the specified target, which in this case is the camera. The "greeting" script then waits one second, before instructing the actor to begin the "wave" and "talk" actions. The script waits another 3 seconds before activating the "sit" action during which time the "wave" action has ended, returning to the default "No Hand Gesture" action in its group. Meanwhile, the "talk" action continues for another three seconds after the actor sits. Two seconds later, the actor bows to the camera, waits another two seconds and then leaves.

In addition to commands that explicitly trigger specific actions and scripts, the present invention provides a number of tools for generating the more non-deterministic behavior required for interactive non-linear applications. An author may specify that an actor choose randomly from a set of actions or scripts, as in the following example:

```
SCRIPT "Rock Paper Scissors"
    {choose from {"Rock" "Paper" "Scissors"}}
```

Once an action or script is chosen, it is executed as though it had been explicitly specified.

Alternately, the author can specify weights associated with each item in the choice. These weights are used to affect the probability of each item being chosen, as in the following example:

```
define SCRIPT "Rock Paper Scissors 2"
    {choose from {"Rock" .5 "Paper" .3 "Scissors"
    .1}}
```

In this case, there is a 5/9 chance the actor executing this script will choose the "Rock" action, a 3/9 chance that the actor will choose the "Paper" action, and a 1/9 chance that the actor will pick the "Scissors" action. The decision is still random, but the author has specified a distinct preference for certain behaviors over others.

To enhance the realism of characters, the method and system of the present invention allows the author to have an actor's decisions reflect the actor's mental state and the state of the actor's environment. An actor's decision about what to do may depend on any number of factors, including mood, time of day, which other actors are in proximity and what they're doing, what the user is doing, etc.

The present invention allows authors to create decision rules which take information about an actor and his environment and use this to determine the actor's tendencies toward certain choices over others. In accordance with the present invention, the author can specify what information is relevant to the decision and how this information influences the weight associated with each choice. As this information changes, the actor's tendency to make certain choices over others will change as well.

The information about an actor and his relationship to his environment are stored in the system as an actor's properties. These properties may be used to describe aspects of an actor's personality such as assertiveness, temperament or dexterity, an actor's current mood such as happiness or alertness, or his relationship to other actors or objects such as his sympathy toward the user or his attitude about dealing with a particular object. These properties can be specified by the author either when the actor is created, or within a clause of a script, to reflect a change in the actor due to some action or event. The latter case is illustrated in the following example:

```
define SCRIPT "Eat Dinner"
    {"Eat"}
    {set my "Appetite" to 0}
    {"Belch"}
```

In this case, the author specifies how the actor's behavior is reflected in his personality by reducing the actor's appetite after eating.

An author can also use properties to provide information about any aspect of an actor's environment, including inanimate props and scenery and even the scripts and actions an actor chooses from. The author can assign properties to actions and scripts describing the various semantic information associated with them, such as aggressiveness, formality, etc. The author can then use these values in the construction of decision rules. Decision rules allow actors to make decisions that reflect the state of the world the author has created.

When a decision rule is invoked, a list of objects is passed to it. The system then uses the decision rule to generate a weight between zero and one for each object. This list can then be used to generate a weighted decision.

Each decision rule consists of a list of author-specified factors, i.e., pieces of information that will influence the actor's decision. Each of these factors is assigned a weight which the author uses to control how much influence that piece of information has upon the decision. This information can simply be the value of a property of an object as in the following example:

```
{choose from {"Steph" "Bob" "Sarah"}
    based on "who's interesting"}
define DECISION-RULE "who's interesting"
    factor {his/her "Charisma"}    influence .8
    factor {his/her "Intelligence"} influence .2
```

In this example, the decision rule will use the "Charisma" and "Intelligence" properties of the three actors to generate a weight for each actor that will be used in the decision. In this case, the author has specified that the value of an actor's "Charisma" will have the greatest influence in determining that weight, whereas the value of an actor's "Intelligence" will have a lesser influence. The influence is optional and defaults to 1.0 if unspecified.

When an object is passed through a decision rule, a weighted sum is made of each of the values returned from the associated factors, modified by the scale assigned to the set of choices. This becomes the final weight assigned to the object that is used in making the decision.

The final weight is determined in accordance with the following equation:

$$\text{FinalWeight} = \text{Scale}(f1^{i1} f2^{i2} \ldots fn^{in})$$

where:

f1, f2 . . . fn are factors 1, 2, . . . n, and i1, i2 . . . in are influences 1, 2, . . . n.

An author can also use the relationship between the actor and the various choices to influence a decision, by making "fuzzy" comparisons between their properties. For example:

```
{choose from {"Fight" "Flee"}
    based on "how courageous"}
define DECISION-RULE: "how courageous"
{
factor {my "Courage" equals its
        "Courage Level" to within 0.5}
}
```

In this example, the author is comparing the actor's "Courage" property with the "Courage Level" property associated with the scripts "Fight" and "Flee". If the actor's "Courage" equals the script's "Courage Level," the decision rule will assign a weight of 1 to that choice. If the values are not equal, a weight between 0 and 1 will be assigned based on the difference between them, dropping to 0 when the difference is greater than the "within" range, in this case, 0.5. As the actor's "Courage" increases or decreases, so will the actor's tendency toward one option or the other.

A fuzzy comparison such as that described above, entails comparing how close an Input Value comes to a Target Value (or Target Range). The result of the comparison is 1 if the Input Value is at the Target Value (or within the Target Range), and drops to 0 at a distance of Spread from the TargetValue. The fuzzy comparison is implemented as follows:

$$y = w(|InputValue - TargetValue|/Spread),$$

where:

y is the Fuzzy Value, and w is a bell curve weighting kernel.

A raised cosine function can be used for the bell curve weighting kernel, w. A high and low spread may be specified, in which case input values greater than the target value (or range) will use the high spread in the calculation, while input values lower than the target value (or range) will apply the low spread.

The returned value is then modified based on the type of fuzzy operation as follows:

| | y Value |
|---|---|
| equals | y Value |
| not equals | 1-y, its complement |
| greater than | y, high spread defaults to infinity |
| not greater than | 1-y, high spread defaults to infinity |
| less than | y, low spread defaults to -infinity |
| not less than | 1-y, low spread defaults to -infinity |

An author may want an actor to choose from a set of options using different factors to judge different kinds of items. A list of objects passed to the decision rule may be divided into subsets using author-defined criteria for inclusion. The weights assigned to a given subset may be scaled, reflecting a preference for an entire group of choices over another. For example:

```
{choose from ("Steph" "Bob" "Sarah")
    based on "who's interesting2"}
define DECISION-RULE: "who's interesting2"
{
```

```
subset "Those I'd be attracted to"                    scale 1
factor {his/her "Intelligence" equals
        my "Confidence" to within .4}
subset "Those I wouldn't be attracted to"
                                                      scale .8
factor {his/her "Intelligence" equals
        my "Intelligence" to within .4}
}
define SUBSET: "Those I'd be attracted to"
    {his/her "Gender" equals my "Preferred Gender"}
define SUBSET: "Those I wouldn't be attracted to"
    {his/her "Gender" does not equal my "Preferred Gender"}
```

Let's assume the actor is considered a heterosexual male (i.e. his "Gender" is "Male" and his "Preferred Gender" is "Female"). The weight assigned to "Steph" and "Sarah" will depend on how closely their intelligence matches our actor's confidence (i.e., being put off by less intelligent women and intimidated by more intelligent ones). The factor used to judge "Bob" reflects a sympathy toward men who are his intellectual equal, unaffected by the actor's confidence. The scale values reflect a general preference for one gender over the other.

It is desirable to give an author the same control over groups of actors that he has over individual actors. The preferred model is that the author is a director who can direct the drama via pre-written behavior rules. To the author, all of the actors constitute a coordinated "cast", which in some sense is a single actor that happens to have multiple bodies.

For this reason, the system of the present invention allows actors to modify each other's properties with the same freedom with which an actor can modify his own properties. From the author's point of view, this is part of a single larger problem of authoring dramatically responsive group behavior. For example, if one actor tells a joke, the author may want the other actors to respond, favorably or not, to the punchline. By having the joke teller cue the other actors to respond, proper timing is maintained, even if the individual actors make their own decisions about how exactly to react. In this way, an actor can give the impression of always knowing what other actors are doing and respond immediately and appropriately in ways that fulfill the author's goals.

Figure 4:
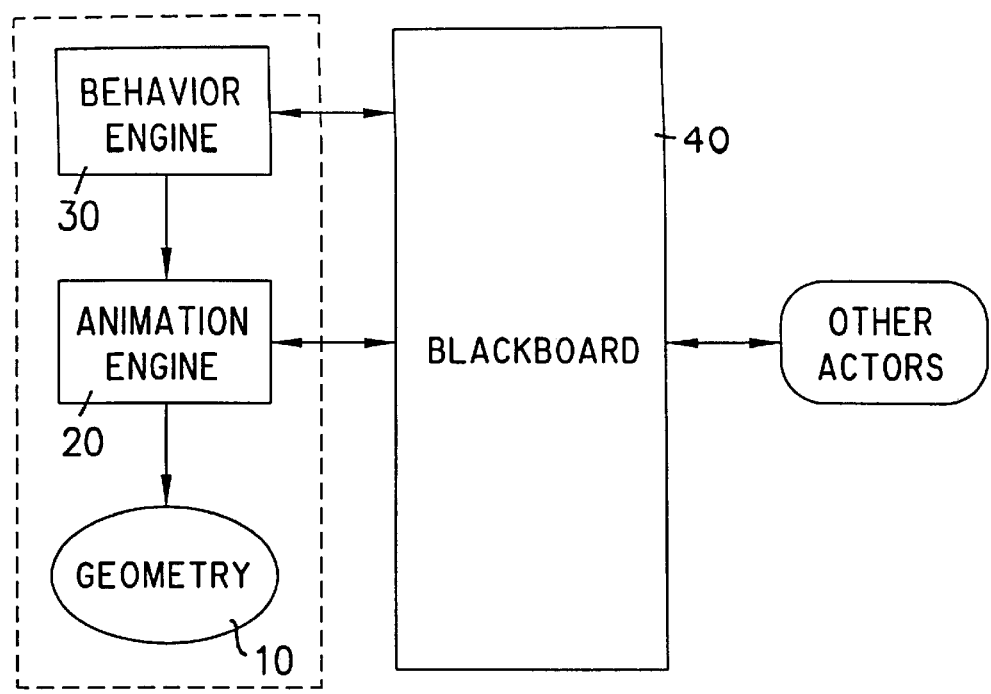
FIG. 4 shows a block diagram of the behavior model of an animated actor including a blackboard for communication with other actors.

This communication occurs through the use of a shared blackboard, as illustrated in the architectural block diagram of FIG. 4. The blackboard 40 allows the actors to be coordinated, whether running on a single processor, on multiple processors or even across a network.

The author can also include user-interface specifications in an actor's scripts. For example, the system can generate widgets at run-time in response to the actor's behavior or to serve the needs of the current scene or interaction. The user can employ these widgets to trigger actions and scripts at any level of the actor's behavioral hierarchy. Directing the actions of one or more animated actors enables users to enter the virtual environment. By making this interface a scriptable element, the present invention enables authors to more easily choreograph the interaction between the virtual actors and human participants.

Figure 5:
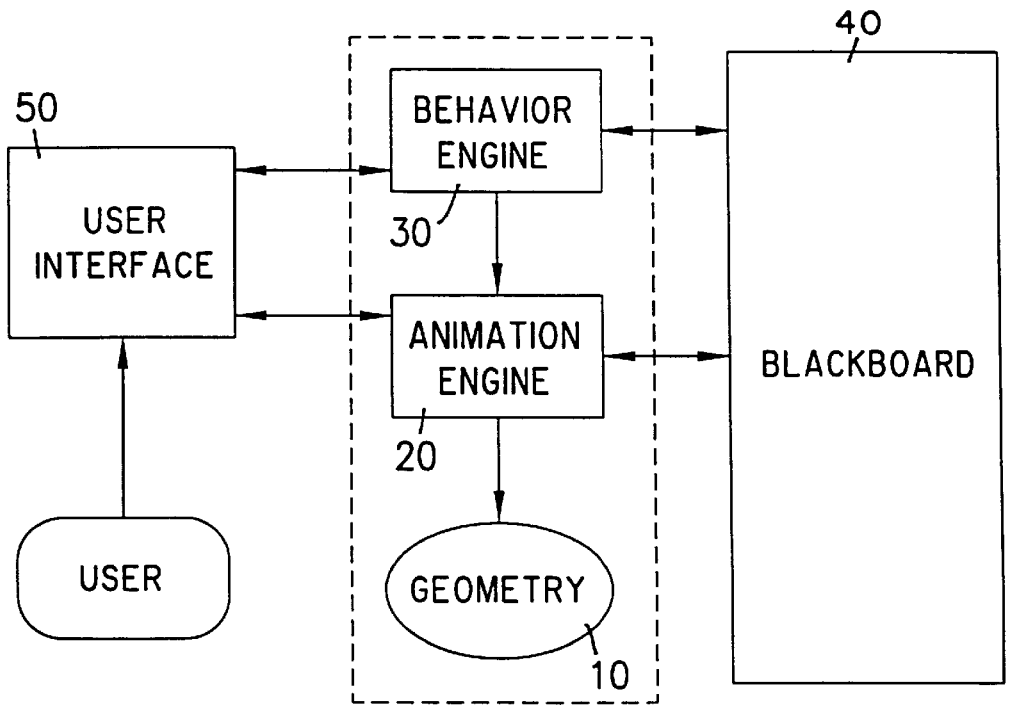
FIG. 5 shows a block diagram of the behavior model of an animated actor including a user interface allowing users to interact with the actor at different semantic levels.

A feature of the present invention is the ability to provide user interaction with the system at different semantic levels. This ability is illustrated in FIG. 5 which shows the behavioral model of an animated actor including a user interface 50. The user interface 50 allows a user to interact with both the Behavior Engine 30 and Animation Engine 20 of an animated actor. The result of a user's actions can cause changes in the system anywhere from high level scripts to low level actions. The system of the present invention allows the author to give the user the right kind of control for every situation. If the user requires a very fine control over the actors' motor skills, the system allows the author to provide the user with direct access to the action level. On the other hand, as when the user is involved in a conversation with an actor, the system allows the author to let the user specify a set of gestures for the actor to use, but have the actor decide on the specific gestures from moment to moment. At an even higher level, the author may want to have the user directing large groups of actors, such as an acting company or an army, in which case he might have the user give the entire group directions and leave it to the individual actors to carry out those instructions. Since any level of the actor's behavior can be made accessible to the user, the author is free to vary the level of control at any point in the application.

Many authors and artists interested in creating interactive content are not primarily programmers. As such, the present invention provides a number of "english-style" scripting language extensions that make it easier for authors and artists to begin scripting interactive scenarios.

The scripting language is written as an extension of the system language. Thus, as users become more experienced they can easily migrate from scripting entirely using the high-level english-style syntax to extending the system through low-level algorithmic control.

The system of the present invention can be distributed over a network. An exemplary embodiment of a system in accordance with the present invention is implemented as a set of distributed programs in UNIX, connected by TCP/IP socket connections, multicast protocols and UNIX pipes. The participating processes can be running on any UNIX machines. This transport layer is hidden from the author.

All communication between participant processes is done by continually sending and receiving programs around the network. These are immediately parsed into byte code and executed. At the top of the communication structure are routing processes. There must be at least one routing process on every participating Local Area Network. The router relays information among actors and renderer processes. For Wide Area Network (WAN) communication, the router opens sockets to routers at other LANs.

In an exemplary embodiment, each actor maintains a complete copy of the blackboard information for all actors. If an actor's behavior state changes between the beginning and end of a time step, the changes are routed to all other actors.

Typical WAN latencies, however, can be several seconds. This poses a problem for two virtual actors interacting over a distributed system. From the viewpoint of believability, some latency is acceptable for high level decisions but not for low level physical actions. For example, when one character waves at another, the second character can get away with pausing for a moment before responding. But two characters who are shaking hands cannot allow their respective hands to move through space independently of each other. The hands must be synchronized to at least the animation frame rate.

The blackboard model makes it possible to deal with this situation gracefully. In an exemplary embodiment, the Behavior Engine and the Animation Engine for an actor can be split across a WAN. The Behavior and Animation Engines can communicate with each other through the blackboard. For the DOFs produced by the Animation Engine, the blackboard is allowed to contain different values at each LAN. For the states produced by the Behavior Engine, the actor maintains a single global blackboard.

Computationally, the Behavior Engine for each actor runs at only a single LAN, whereas the Animation Engine runs at each LAN. When two characters must physically coordinate with each other, they use the local versions of their DOFs. In this way, an actor is always in a single Behavioral State everywhere on the WAN, even though at each LAN he might appear to be in a slightly different position. In a sense, the actor has one mind, but multiple bodies.

Figure 6:
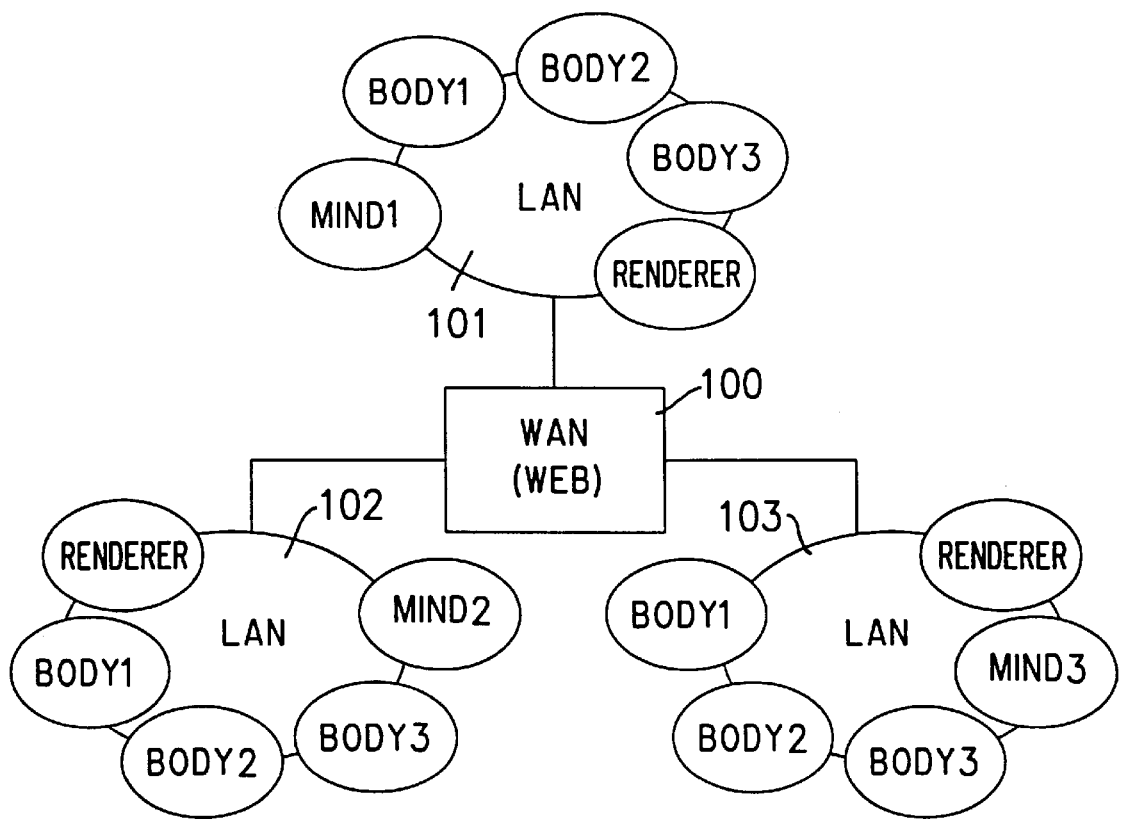
FIG. 6 shows a block diagram of a model for distributing components of the system of the present invention over a Wide Area Network.

This distributed arrangement is illustrated in FIG. 6 which shows a block diagram of a Wide Area Network distribution model for an exemplary embodiment of the system of the present invention. In the configuration of FIG. 6, a WAN 100 links three LANs 101, 102 and 103, in a known manner. The WAN 100 can be the world wide web, for example. On each LAN, one "mind", or Behavior Engine is executed for one of three animated characters, whereas separate "bodies", or Animation Engines, are executed for each of the three characters on each of the three LANs. The various body renderings of an actor inhabit a parallel universe. Although these bodies may differ slightly in their position within their own universe, they are all consistent with the actor's single mind.

This leads to an interesting property. Suppose that an actor is dancing while balancing a tray in a particular scene. Further, suppose that the scene is being watched at the same time by users in Sao Paulo, Brazil, and in Manhattan, N.Y., with a connection over the Internet. Perhaps some of the users are interacting with the actor. In this scene, the actor's Behavior Engine makes all the choices about whether to dance, whether to keep balancing the tray, how much joy and abandon versus self-conscious restraint he puts into the dance, etc. The actor's Animation Engine sets all the DOFs that determine how he moves when doing these things, so that they remain responsive and coordinated.

Figure 7B:
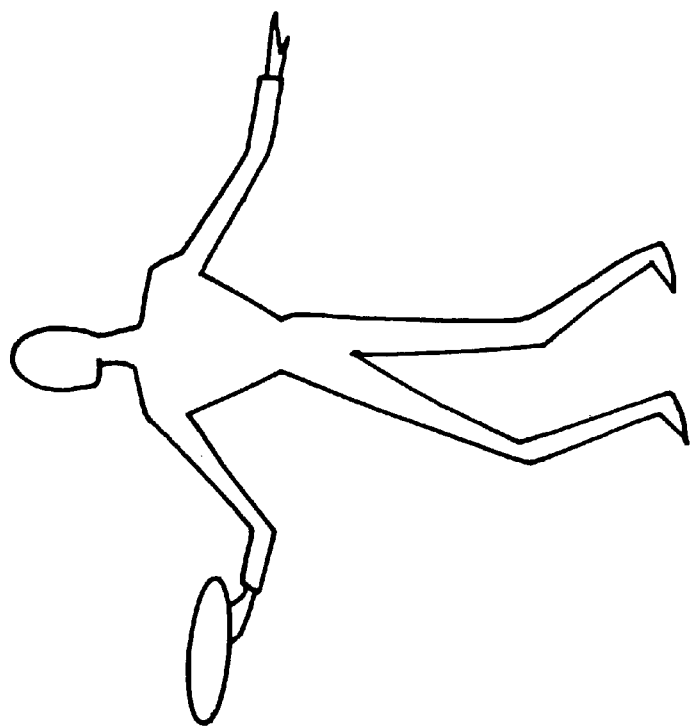
FIGS. 7a and 7b illustrate two renderings of the same animated actor performing the same action.
Figure 7A:
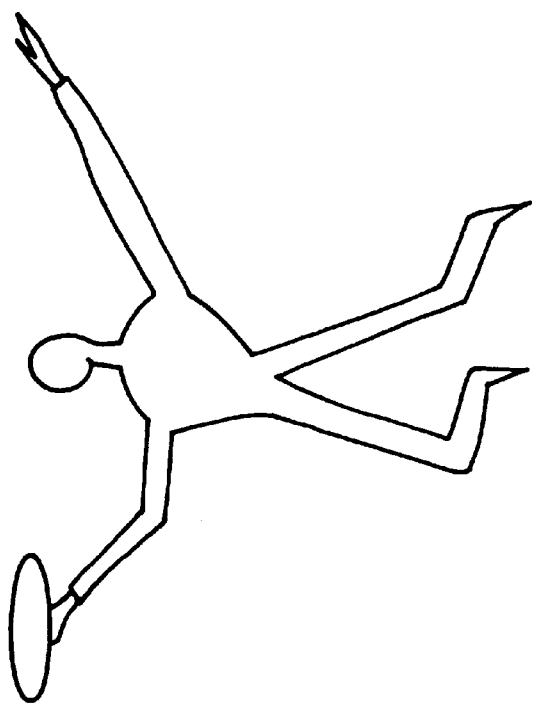

If the viewers in New York and those in Sao Paulo are talking on the telephone, they will report seeing the same thing. Yet, if a high speed dedicated video link were established and participants could see the two renderings of the actor side by side, they would see two somewhat different animations, for example, as shown in FIGS. 7a and 7b. In one, the actor's hand might thrust up to balance the tray half a second sooner, in the other he might have his other arm extended a bit further out. He might be rocking right to left in one screen, while he is rocking from left to right in the other.

Thus, while there may be only one such actor with the behavior described above—with his mood, his personality, and engaged in that particular task—the same actor can have many, slightly different physical realities, differing only up to the threshold where they might disrupt the social unity of his Behavioral State.

If communication lag exceeds several seconds, significant differences may have occurred between the various instances of the actor. For example, suppose two actors that are temporarily out of communication each try to pick up some physical object. One reliable solution to this collaborative work dilemma is to make the object itself an actor. Furthermore, the object itself must agree to be picked up, since it too must maintain a consistent physical reality.

The blackboard protocol has a great advantage in terms of flexibility. To take full advantage of this flexibility, a support library that gives access to the blackboard is provided in an embodiment of the system of the present invention. The support library can be written in a known programming language such as C. This allows authors unfamiliar with the system of the present invention, except for the names of actions and scripts, to immediately begin to control virtual actors.

For example, a researcher can write a standalone C program that links with the support library. The program can pass string arguments such as "Gregor Sit" or "Otto Walk-To-Door" to an output function. In this manner, the standalone program can modify actors' behavior states.

Because the system treats the standalone program as just another actor, the program can also listen for messages by calling an input routine. These messages contain the information that updates the blackboard with the actors' locations, current activities, moods, etc. In practice, this allows researchers at remote locations, who may know nothing about the system of the present invention except its GUI, to immediately begin to use the system for their own applications. This is a highly effective way for collaborators to bootstrap.

The system of the present invention can also include several audio subsystems. Such subsystems are used for generating speech and/or music, allowing actors to follow musical cues, and generating ambient background noise.

As disclosed, the system of the present invention allows actors and users to interact with each other. An example of a scene involving multiple actors involved in a social interaction with a user will now be described.

The following script sets forth a joke telling scenario involving multiple actors and a user:

```
define SCRIPT "Tell Joke"
{
    {do "Turn to Face" to
        choose from {others except player}
    }
    {cue {others except player} to
        "Listen To Joke" to me}
    {
    do "No Soap, Radio"
    do "Joke Gestures" }
    {wait until {current "Joke" is "completed"}}
    {do "Laugh" for 3 seconds}
    {cue {others except player} to "React To Joke"}
    {wait 3 seconds}
    {do "React To Player"}
}
```

In this example, the actor executing the script randomly chooses one of the actors not controlled by the user, and turns to the chosen actor. The actor then cues the other non-user actors to execute the "Listen To Joke" script, in which the actor chooses the appropriate gestures and body language that will give the appearance of listening attentively.

```
define SCRIPT "Listen To Joke"
{
    {
    choose from { entire set of "Stances" } based on
        "appropriate listening gestures"
    choose from { entire set of "Gestures" } based
        on "appropriate listening gestures"
    }
    {continue for between 3 and 12 seconds}
    {repeat}
}
```

In this case, the actor chooses from the actions in the sets "Stances" and "Gestures" using the decision rule "appropriate listening gestures".

```
define DECISION_RULE "appropriate listening gestures"
{
    subset "Listening?"                          scale 1
    factor {
        my "confidence" is greater than
        its "confidence" to within 0.3
        }                                        influence .5
    factor {
        my "self control" is less than
        its "self control" to within 0.3
        }                                        influence .5
}
define SUBSET "Listening?"
    {it is "reactive" and "conversational" or
    "generic"}
```

In this decision rule, the actor narrows the list down to those actions that are reactive and conversational, or generic actions that can be used in any context. The rule then compares the "confidence" and "self control" of the actor to those assigned to each action, creating a weighted list favoring actions that match the fuzzy criteria. After choosing from the list, the actor will wait from 3 to 12 seconds before repeating the script and choosing another gesture.

Meanwhile, the actor telling the joke then executes the "No Soap, Radio" script which contains a command to an external speech system to generate the text of the joke. At the same time, the actor executes the "Joke Gestures" script which, like the "Listen To Joke" script chooses appropriate gestures based on the actor's personality.

The actor continues until the joke is finished (i.e., the speech subsystem sends a command to set the script's "completed" property to true) and then laughs, cueing the other actors to execute the "React To Joke" script.

```
define SCRIPT "React To Joke"
{
    {
    choose from { "Laugh" "Giggle" "Ignore" "Get
    Upset"} based on "feelings toward player"
    }
}
define DECISION_RULE "feelings toward player"
{
    factor {my "sympathy toward" player
        does not equal its "mood" to within .4}
}
```

Simply put, the more sympathy the actors have for the player, the less likely they are to react positively to the joke.

Finally, the actor executes the "React To Player" script in which the actor chooses an appropriate reaction to the player, depending on whether or not the player tells his actor to laugh. If he does, the joke teller laughs, either maliciously, if her sympathy for the player is low, or playfully, if her sympathy for the player is high. If the player's actor doesn't laugh, the joke teller executes the "Get It?" script. This script taunts the player until he gets mad and/or leaves.

The system of the present invention can also operate in conjunction with voice recognition. In one embodiment, an animated interactive embodied actor can respond to spoken statements and requests. A voice recognition subsystem which can be used in conjunction with the system of the present invention is available from DialecTech. With such an embodiment, untrained participants can conduct a game, such as "Simon Says" with the actor. The actor will follow requests only if they are preceded by the words "Simon Says". To make it more interesting, the actor can be programmed so that sometimes he also follows requests not preceded by "Simon Says", but then acts embarrassed at having been fooled. Such interaction increases the sense of psychological involvement by the participants. Participants appear to completely "buy into" the animated actor's presence. This is likely due to several factors, namely, because the participants could talk with the actor directly, the participants know that the actor is not being puppeteered (being that the participant is the only human in the interaction loop), and because the actor's motions are relatively lifelike and never repeat themselves precisely.

In a further embodiment, a user can be represented as an embodied avatar, further enhancing the user's sense of fun, play, and involvement. The participant is presented with a large rear projection of a room full of embodied conversational agents. The system includes an overhead video camera which tracks the user's position and arm gestures. The user can be represented, for example, as a flying bat. As the participant walks around, the bat flies around accordingly. The nearest actor will, for instance, break out of conversing with other actors and begin to interact with the bat. When the participant flaps her arms, the bat flies higher in the scene and the camera follows. This gives the participant a sense of soaring high in the air.

The system of the present invention is a useful tool for the embodiment of intelligent actors, especially for the study of social interaction. In particular, it is a good tool for building educational virtual reality environments, when used in conjunction with research software for virtual interactive theater. The combination can be used to simulate behaviors that would be likely to engage children to respond to, identify with, and learn from knowledge agents.

A further embodiment of the present invention includes extensions so that animators can use commercial tools, such as Alias and SoftImage, to create small atomic animation components. Trained animators can use these tools to build up content. Such content can include various walk cycles, sitting postures, head scratching, etc. The procedural animation subsystem is designed in such a way that such action styles can be blended. For example, two or three different styles of walks can be separately designed from a commercial key frame animation package and then blended together. They can also be blended with various procedural walks, to create continuously variable walk styles that reflect the actor's current mood and attitude, as well as the animator's style.

In traditional animation, human motions are created from combinations of temporarily overlapping gestures and stances. The system of the present invention can be used to tie into commercial animation tools to build up a library of component motions, and to classify these motions in a way that makes them most useful as building blocks. The system of the present invention can also be embedded into a client-based application for a Java compatible browser (such as Netscape Navigator version 2.0).

The system of the present invention can be implemented as a full 3D system or as a "nearly 3D" system for lower-end applications. The nearly-3D version can be implemented with a low-end platform, such as a personal computer. The user can still be able to see a view into a three-dimensional world, but the visual representations of the actors are simpler and largely two-dimensional. Furthermore, participants using systems with different capabilities (e.g., an SGI Onyx workstation and an Intel '486-based PC) can still interact in the same scene. Both users would see the same actor, at the same location, performing the same action and having the same personality. The only difference would be that the user with the higher performance system will see a much more realistic quality of rendering.

In a further embodiment, the english-style behavioral sub-system can be integrated with a voice recognition sub-system. This allows a user to fully exploit the object substrate and give access to the direction of goals, mood changes, attitudes and relationships between actors. Such direction can be provided via spoken sentences.

The method and system of the present invention is applicable to a wide variety of applications, including computer role playing games, simulated conferences, "clip animation," graphical front ends for MUDs, synthetic performance, shared virtual worlds, interactive fiction, high-level direction for animation, digital puppetry, computer guides and companions, point-to-point communication interfaces, and true, non-linear narrative television.

What is claimed is:

1. A method for rendering at least one animated actor, comprising the steps of:

defining a first action for at least one animated actor;

defining a second action for the at least one animated actor;

selecting at least one of the first action and the second action via a user input; and rendering the at least one animated as a function of the user input, in real time, by layering at least one of the first action and the second action on top of the other one of the first action and the second action, wherein the first action is modifiable as a function of the second action when the first and second actions are both being executed.

2. The method according to claim 1, further comprising the step of:

including at least one of the first action and the second action into at least one script, the at least one script including at least one of a further action and a secondary script, wherein the at least one animated actor is rendered as a further function of the at least one script.

3. The method according to claim 1, further comprising the steps of:

grouping at least one first script and at least one second script into a first script group; and grouping at least one third script into a second script group, wherein each script in the first script group and second script group includes at least one of a predetermined action and a predetermined secondary script.

4. The method according to claim 3, further comprising the step of:

when a further script in one of the first script group and the second script group is selected, continuing an operation of another script of the other one of the first script group and the second script group in which the further script was not selected.

5. The method according to claim 1, wherein the at least one animated actor includes a set of personal characteristics, wherein the at least one animated actor is surrounded by a rendered environment, the rendered environment having a set of environment characteristics, the method further comprising the steps of:

defining a decision rule, the decision rule making a selection from a set of predetermined data corresponding to at least one of the set of personal characteristics and the set of environment characteristics; and rendering the animated actor as a further function of the selection.

6. The method according to claim 1, further comprising the steps of:
defining a decision rule for selecting one of a set of predetermined data which corresponds to a set of possible actions; and
rendering the animated actor as a further function of the selection.

7. The method according to claim 1, wherein the at least one animated actor includes a set of geometric shapes connected by rotating joints.

8. The method according to claim 7, wherein each one of the first action and the second action is defined by a set of time-varying degrees of freedom.

9. The system according to claim 1, wherein the user input is provided via a user interface.

10. A method for rendering at least one animated actor, comprising the steps of:
defining a first action for at least one animated actor;
defining a second action for the at least one animated actor;
selecting at least one of the first action and the second action via a user input; and
rendering the at least one animated as a function of the user input, in real time, by layering at least one of the first action and the second action on top of the other one of the first action and the second action, wherein the at least one animated actor includes a first portion and a second portion, wherein the first portion includes a first movement of the first portion and a second movement of the second portion, wherein the second action includes a third movement of the first portion, and wherein the second action is layered on top of the first action by transitioning from the first movement of the first portion of the at least one animated actor to the third movement of the first portion without a necessity to return to an original position of the first movement.

11. A method for rendering at least one animated actor, comprising the steps of:
defining a first action for at least one animated actor;
defining a second action for the at least one animated actor;
selecting at least one of the first action and the second action via a user input; and
rendering the at least one animated as a function of the user input, in real time, by layering at least one of the first action and the second action on top of the other one of the first action and the second action, wherein the at least one animated actor is rendered as a further function of a coherent noise.

12. A method for rendering at least one animated actor, comprising the steps of:
defining a first action for at least one animated actor;
defining a second action for the at least one animated actor;
selecting at least one of the first action and the second action via a user input;
rendering the at least one animated actor as a function of the user input, in real time, by layering at least one of the first action and the second action on top of the other one of the first action and the second action;
grouping at least one first script and at least one second script into a first script group;

grouping at least one third script into a second script group, wherein each script in the first script group and the second script group includes at least one predetermined action; and
when a further script in one of the first script group and the second script group is selected, terminating an operation of another script of the first script group and the second script group in which the further script was selected.

13. A method for rendering at least one animated actor, comprising the steps of:
defining a first action for at least one animated actor;
defining a second action for the at least one animated actor;
selecting at least one of the first action and the second action via a user input;
rendering the at least one animated actor as a function of the user input, in real time, by layering at least one of the first action and the second action on top of the other one of the first action and the second action;
grouping the first action and at least one further first action into a first action group, each action of the first action group competing with another action of the first action group to determine which one of the competing actions in the first action group is performed before the other one of the competing actions; and
grouping the second action and at least one further second action into a second action group, each action of the second action group competing with another action of the second action group to determine which one of the competing actions in the second action group is performed before the other one of the competing actions.

14. The method according to claim 13, wherein any action of the second action group may be layered on top of any other action of the first action group to render the at least one animated actor.

15. The method according to claim 14, further comprising the steps of:
further rendering the at least one animated actor as a function of one of the first action and the at least one first further action by transitioning from the first action to the at least one first further action.

16. A method for rendering at least one animated actor, comprising the steps of:
defining a first action for at least one animated actor;
defining a second action for the at least one animated actor;
selecting at least one of the first action and the second action via a user input;
rendering the at least one animated actor as a function of the user input, in real time, by layering at least one of the first action and the second action on top of the other one of the first action and the second action;
providing a user with a visual list, the visual list containing a set of selections corresponding to a set of action;
receiving a user input for selecting one of the set of actions; and
further rendering the at least one animated actor as a function of the selected one of the set of actions.

17. A system for rendering at least one animated actor, comprising:
an output device;
a processing device executing:
a first instruction defining a first action for at least one animated actor, and a second instruction defining a second action for at least one animated actor, and an input device receiving a user input for selecting at least one of the first action and the second action, the processing device rendering the at least one animated actor via the output device as a function of the user input, in real time, by layering at least one of the first action and the second action on top of the other one of the first action and the second action, wherein the processor is capable of modifying the first action as a function of the second action when the first and second actions are both being executed.

18. The system according to claim 17, further comprising:
a storage device storing the at least one of the first action and the second action into at least one script, the at least one script including at least one of a further action and a secondary script,
wherein the processing device renders the at least one animated actor as a further function of the-at least one script.

19. The system according to claim 17, further comprising:
a storage device storing at least one first script and at least one second script into a first script group and at least one third script into a second script group,
wherein each script in the first script group and second script group includes at least one of a predetermined action and a predetermined secondary script.

20. The system according to claim 19, wherein, when a further script in one of the first script group and the second script group is selected, the processing device continues an operation of another script of the other one of the first script group and the second script group in which the further script was not selected.

21. The system according to claim 17, wherein the at least one animated actor includes a set of personal characteristics, wherein the at least one animated actor is surrounded by a rendered environment, the rendered environment having a set of environment characteristics, the system further comprising:
a storage device storing a decision rule, the decision rule making a selection from a set of predetermined data corresponding to at least one of the set of personal characteristics and the set of environment characteristics, wherein the processing device renders the animated actor as a further function of the selection.

22. The system according to claim 17, further comprising:
a storage device storing a decision rule for selecting one of a set of predetermined data which corresponds to a set of possible actions, wherein the processing device renders the animated actor as a further function of the selection.

23. The system according to claim 17, wherein the at least one animated actor includes a set of geometric shapes connected by rotating joints.

24. The system according to claim 17, wherein each one of the first action and the second action is defined by a set of time-varying degrees of freedom.

25. The system according to claim 17, further comprising:
a communications apparatus connecting the processing device to at least one further processing device which renders a further animated actor.

26. The system according to claim 25, wherein the communications apparatus includes at least one of a modem, a local area network, a wide area network, an Intranet, and an Internet communication system.

27. The system according to claim 25, wherein the processing device executes instructions utilizing a UNIX operating system.

28. The system according to claim 25, wherein the processing device and the at least one further processing device communicate via a blackboard.

29. The system according to claim 17, wherein the user device receives the user input that is provided via a user interface.

30. A system for rendering at least one animated actor, comprising:
an output device;
a processing device executing:
a first instruction defining a first action for at least one animated actor, and
a second instruction defining a second action for at least one animated actor; and
an input device receiving a user input for selecting at least one of the first action and the second action, the processing device rendering the at least one animated actor via the output device as a function of the user input, in real time, by layering at least one of the first action and the second action on top of the other one of the first action and the second action,
wherein the at least one animated actor includes a first portion and a second portion, wherein the first portion includes a first movement of the first portion and a second movement of the second portion, wherein the second action includes a third movement of the first portion, and wherein the second action is layered on top of the first action by transitioning from the first movement of the first portion of the at least one animated actor to the third movement of the first portion without a necessity to return to an original position of the first movement.

31. A system for rendering at least one animated actor, comprising:
an output device;
a processing device executing:
a first instruction defining a first action for at least one animated actor, and
a second instruction defining a second action for at least one animated actor; and
an input device receiving a user input for selecting at least one of the first action and the second action, the processing device rendering the at least one animated actor via the output device as a function of the user input, in real time, by layering at least one of the first action and the second action on top of the other one of the first action and the second action,
wherein the processing device renders the at least one animator actor as a further function of a coherent noise.

32. A system for rendering at least one animated actor, comprising:
an output device;
a processing device executing:
a first instruction defining a first action for at least one animated actor, and
a second instruction defining a second action for at least one animated actor,
an input device receiving a user input for selecting at least one of the first action and the second action, the processing device rendering the at least one animated actor via the output device as a function of the user input, in real time, by layering at least one of the first action and the second action on top of the other one of the first action and the second action; and
a storage device storing at least one first script and at least one second script into a first script group, and at least one third script into a second script group, wherein each script in the first script group and the second script group includes at least one predetermined action, and wherein, when a further script in one of the first script group and the second script group is selected, the processing device terminates an operation of another script of the first script group and the second script group in which the further script was selected.

33. A system for rendering at least one animated actor, comprising:

an output device;

a processing device executing:

a first instruction defining a first action for at least one animated actor, and a second instruction defining a second action for at least one animated actor;

an input device receiving a user input for selecting at least one of the first action and the second action, the processing device rendering the at least one animated actor via the output device as a function of the user input, in real time, by layering at least one of the first action and the second action on top of the other one of the first action and the second action; and a storage device storing the first action and at least one further first action into a first action group, each action of the first action group competing with another action of the first action group to determine which one of the competing actions in the first action group is performed before the other one of the competing actions, the storage device further storing the second action and at least one further second action into a second action group, each action of the second action group competing with another action of the second action group to determine which one of the competing actions in the second action group is performed before the other one of the competing actions.

34. The system according to claim 33, wherein any action of the second action group is capable of being layered on top of any other action of the first action group to render the at least one animated actor.

35. The system according to claim 34, wherein the processing device further renders the at least one animated actor as a function of one of the first action and the at least one first further action by transitioning from the first action to the at least one first further action.

36. A system for rendering at least one animated actor, comprising:

an output device;

a processing device executing:

a first instruction defining a first action for at least one animated actor, and a second instruction defining a second action for at least one animated actor; and an input device receiving a user input for selecting at least one of the first action and the second action, the processing device rendering the at least one animated actor via the output device as a function of the user input, in real time, by layering at least one of the first action and the second action on top of the other one of the first action and the second action, wherein the processing device provides a user with a visual list, the visual list including a set of selections which correspond to a set of actions, wherein the input device receives the user input for selecting one of the set of actions, and wherein the processing device further renders the at least one animated character as a function of the selected one of the set of actions.

37. A method for rendering at least one animated actor, comprising the steps of:

providing a library of predetermined actions for executing a first action;

providing at least one script which includes at least one of a second action and a secondary script;

via a user interface, visually providing a set of selections corresponding to at least one of the library of predetermined actions and the at least one script;

selecting, via a user input, at least one member of the set of selections that is visually provided on the user interface; and rendering the at least one animated actor, in real time, as a function of the at least one selected member of the set of selections.

38. The method according to claim 37, wherein the set of selections correspond to the first action and the at least one script.

39. The method according to claim 37, wherein, before the at least one selected member of the set of selections is selected, the at least one animated actor is rendered to perform an initial action, and wherein, after the at least one selected member of the set of selections is selected, at least one of the first action and the at least one script is layered relative to the initial action to render the at least one animated actor.

40. The method according to claim 37, wherein the at least one selected member includes at least two selected members, wherein the at least one animated actor is rendered by layering actions corresponding to the at least two members on top of one other, and wherein at least one of the actions corresponding to the at least two selected members is capable of being modified based on another one of the actions corresponding to the at least two selected members when the corresponding actions are both being executed.

* * * * *

UNITED STATES PATENT AND TRADEMARK OFFICE
CERTIFICATE OF CORRECTION

PATENT NO. : 6,285,380 B1
DATED : September 4, 2001
INVENTOR(S) : Perlin et al.

It is certified that error appears in the above-identified patent and that said Letters Patent is hereby corrected as shown below:

Title page,
Item [56], References Cited, U.S. PATENT DOCUMENTS, insert
-- 5,594,956  1/1997  Girard ...... 395/173 --
OTHER PUBLICATIONS, insert
-- Cachola D. et al., "Modeling and Animating Three-Dimensional Articulate figures", Graphics Interface '86, Vision Interface '86, May 1986, pp. 152-157

Thalman D. et al., "Fast Realistic Human Body Deformations for Animation and VR Applications", IEEE, July 1996, pp. 166-174. --

Column 2,
Line 13, "30" should be deleted
Line 25, "*Leaming*" should read -- *Learning* --

Column 3,
Line 18, ""english-" should read -- "English- --

Column 4,
Line 56, "10" should read -- 10 --

Column 6,
Line 21, ""Talk Gesturel"" should read -- "Talk Gesture1" --

Column 7,
Before line 55, insert -- ¶Then, suppose actions are selected in the following order:
　　　　　　　　Stand
　　　　　　　　Walk
　　　　　　　　Wave_left
　　　　　　　　Scratch_head_left
　　　　　　　　No_scratching
　　　　　　　　Wave_right --

Column 14,
Line 46, "40" should read -- 40 --

Column 15,
Line 19, ""english-style"" should read -- "English-style" --
Line 25, "english-style" should read -- English-style --

Column 20,
Line 4, "english-style" should read -- English-style --
Line 26, "animated" should read -- animated actor --

UNITED STATES PATENT AND TRADEMARK OFFICE
CERTIFICATE OF CORRECTION

PATENT NO. : 6,285,380 B1
DATED : September 4, 2001
INVENTOR(S) : Perlin et al.

It is certified that error appears in the above-identified patent and that said Letters Patent is hereby corrected as shown below:

Column 21,
Line 22, "actor," should read -- actor; --
Lines 26 and 48, "animated" should read -- animated actor --

Column 22,
Lines 42 and 43, "first further" should read -- further first --
Line 55, "action;" should read -- actions; --

Column 23,
Line 2, "actor, and" should read -- actor; and --
Line 18, "the-at" should read -- the at --

Column 24,
Line 48, "animator" should read -- animated --
Line 57, "actor," should read -- actor; --

Column 25,
Line 44, "first" should read -- further --
Line 45, "further" should read -- first --
Line 46, "first further" should read -- further first --

Column 26,
Line 13, "character" should read -- actor --
Line 53, "correspond" should read -- corresponds --

Signed and Sealed this

Sixth Day of January, 2004

JAMES E. ROGAN
*Director of the United States Patent and Trademark Office*